United States Patent
Deng et al.

(10) Patent No.: US 10,725,693 B2
(45) Date of Patent: Jul. 28, 2020

(54) DATA PROCESSING METHOD AND APPARATUS

(71) Applicant: BEIJING BAIDU NETCOM SCIENCE AND TECHNOLOGY CO., LTD., Beijing (CN)

(72) Inventors: Chengliang Deng, Beijing (CN); Haifeng Wang, Beijing (CN); Kaiwen Feng, Beijing (CN); Yibing Liang, Beijing (CN); Bocong Liu, Beijing (CN); Zhou Chen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 520 days.

(21) Appl. No.: 15/410,927

(22) Filed: Jan. 20, 2017

(65) Prior Publication Data

US 2018/0074755 A1 Mar. 15, 2018

(30) Foreign Application Priority Data

Sep. 13, 2016 (CN) .......................... 2016 1 0822506

(51) Int. Cl.
*G06F 3/06* (2006.01)
*G06T 1/60* (2006.01)
(Continued)

(52) U.S. Cl.
CPC ............ *G06F 3/0659* (2013.01); *G06F 3/067* (2013.01); *G06F 3/0611* (2013.01); *G06T 1/60* (2013.01);
(Continued)

(58) Field of Classification Search
CPC ............................................ G06F 3/061–0613
See application file for complete search history.

(56) References Cited

U.S. PATENT DOCUMENTS

2010/0302028 A1* 12/2010 Desai ................ H04W 52/0258
340/539.3
2013/0166113 A1* 6/2013 Dakin ..................... G01N 21/53
701/10

(Continued)

FOREIGN PATENT DOCUMENTS

CN 102299843 A 12/2011

OTHER PUBLICATIONS

Chinese Office Action for Chinese Priority Application No. 201610822506.X: Office Action dated Aug. 27, 2018.

*Primary Examiner* — Nicholas J Simonetti
(74) *Attorney, Agent, or Firm* — Miller, Matthias & Hull LLP

(57) ABSTRACT

The present application discloses a data processing method and apparatus. A specific implementation of the method includes: simultaneously acquiring, by a data processing party, data to be used by a plurality of data receiving parties, and processing the to-be-used data according to processing mode information that is received in advance from each data receiving party and that indicates a processing mode for the to-be-used data, to obtain processed to-be-used data corresponding to the data receiving party; and storing the processed to-be-used data into a storage area corresponding to the data receiving party. An independent data processing party for simultaneously acquiring data that needs to be processed by each data receiving party is provided, so that the data that needs to be processed by each data receiving party is acquired at a time.

8 Claims, 6 Drawing Sheets

(51) Int. Cl.
*G06T 15/00* (2011.01)
*G05D 1/02* (2020.01)

(52) U.S. Cl.
CPC ......... *G06T 15/005* (2013.01); *G05D 1/0231* (2013.01)

(56) References Cited

U.S. PATENT DOCUMENTS

2015/0293228 A1* 10/2015 Retterath ................ G01S 17/89
356/5.01
2018/0353106 A1* 12/2018 Han ........................ G06F 19/00

* cited by examiner

DATA PROCESSING METHOD AND APPARATUS

CROSS-REFERENCE TO RELATED APPLICATION

This application is related to and claims priority from Chinese Application No. 201610822506.X, filed on Sep. 13, 2016, the entire disclosure of which is hereby incorporated by reference.

TECHNICAL FIELD

The present application relates to the field of computers, particularly to the field of data processing, and more particularly to a data processing method and apparatus.

BACKGROUND

In a system such as an autonomous driving system, usually several processes need to work collaboratively to complete a task. For example, the processes in the autonomous driving system work collaboratively to build a three-dimensional model of a vehicle driving environment by using motion-compensated laser point cloud data. In a commonly used method, each process works separately on to-be-used data. For example, each process copies to-be-processed data separately from a memory to a graphics processing unit for processing.

However, when there is massive data, system overheads will sharply increase. For example, each independent data processing process has a corresponding procedure of copying data from the memory to the graphics processing unit, during which the operation currently in the process needs to be suspended, e.g. an operation of sensing the driving environment for building the three-dimensional model of the vehicle driving environment will be suspended. As a result, the performance efficiency of the system is reduced, failing to meet the extremely high demands of the autonomous driving system on real-time operation.

SUMMARY

The present application provides a data processing method and a data processing apparatus, to solve the technical problem mentioned in the Background.

According to a first aspect, the present application provides a data processing method, comprising: acquiring simultaneously, by a data processing party, data to be used by data receiving parties; and processing the to-be-used data, based on processing mode information received a priori from the receiving parties and indicating a processing mode for the to-be-used data, to obtain processed to-be-used data corresponding to the data receiving parties; and storing the processed to-be-used data into a storage area corresponding to the data receiving parties, so that the data receiving parties acquire the processed to-be-used data from the storage area.

According to a second aspect, the present application provides a data processing method, comprising: acquiring, by a data receiving party, processed data, the processed data being obtained after a data processing party simultaneously acquiring data to be used by data receiving parties and processing the to-be-used data based on processing mode information received a priori from the data receiving parties and indicating a processing mode for the to-be-used data; and executing a preset operation on the processed data.

According to a third aspect, the present application provides a data processing apparatus, comprising: a processing unit, configured to acquire simultaneously data to be used by data receiving parties; and process the to-be-used data, based on processing mode information received a priori from the receiving parties and indicating a processing mode for the to-be-used data, to obtain processed to-be-used data corresponding to the data receiving parties; and a storage unit, configured to store the processed to-be-used data into a storage area corresponding to the data receiving parties, so that the data receiving parties acquire the processed to-be-used data from the storage area.

According to a fourth aspect, the present application provides a data processing apparatus, comprising: an acquiring unit, configured to acquire processed data, the processed data being obtained after a data processing party simultaneously acquiring data to be used by data receiving parties and processing the to-be-used data based on processing mode information received a priori from the data receiving parties and indicating a processing mode for the to-be-used data; and an execution unit, configured to execute a preset operation on the processed data.

According to the data processing method and apparatus provided by the present application, a data processing party simultaneously acquires data to be used by a plurality of data receiving parties, and processes the to-be-used data according to processing mode information that is received in advance from each data receiving party and that indicates a processing mode for the to-be-used data, to obtain processed to-be-used data corresponding to the data receiving party; and stores the processed to-be-used data into a storage area corresponding to the data receiving party. An independent data processing party for simultaneously acquiring data that needs to be processed by each data receiving party is provided, so that the data that needs to be processed by each data receiving party is acquired at a time, for example, copied from a memory to a video memory of a graphics processing unit at a time and processed by using the graphics processing unit. This avoids the problem that system overheads sharply increase because copying from the memory to the graphics processing unit needs to be performed multiple times when each data receiving party separately performs data processing, thereby improving the execution efficiency of the system.

BRIEF DESCRIPTION OF THE DRAWINGS

Other features, purposes and advantages of the present application will become more apparent from a reading of the detailed description of the non-limiting embodiments in the reference with the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail in reference with the accompanying drawings and in combination with the embodiments.

Figure 1:
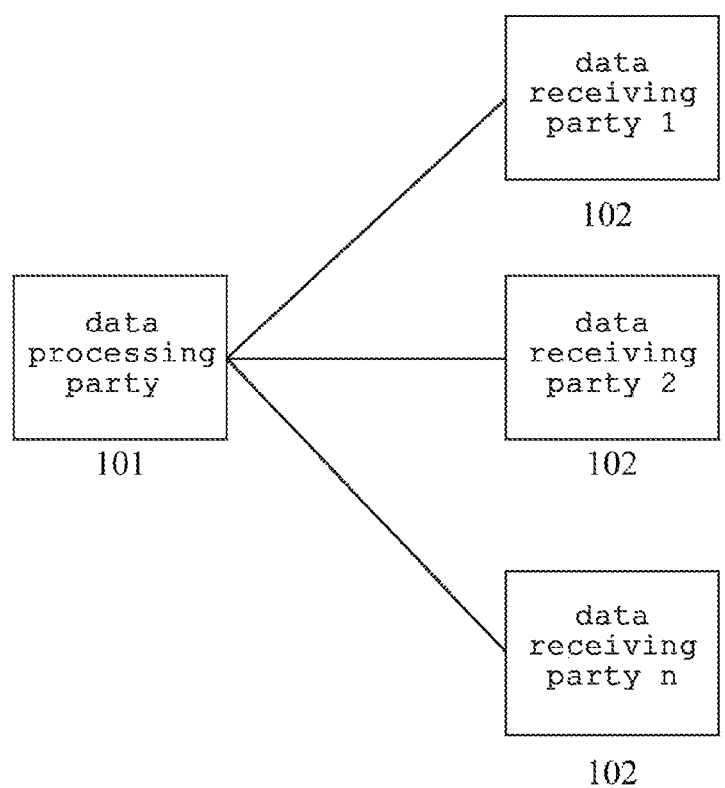
FIG. 1 illustrates an exemplary system architecture to which a data processing method or apparatus of the present application can be applied.

FIG. 1 illustrates an exemplary system architecture 100 to which a data processing method or apparatus of the present application can be applied.

As shown in FIG. 1, the system architecture 100 may include: a data processing party 101 and a plurality of data receiving parties 102. The data processing party 101 and the data receiving parties 102 may be processes running in an autonomous driving vehicle control system of an autonomous driving vehicle. The autonomous driving vehicle may be provided with: laser radars; sensors deployed inside or outside the vehicle, for example, a speed sensor, an angle sensor, and a collision sensor; and a bus for transmitting data sensed by the sensors, for example, a controller area network (CAN) bus. The data processing party 101 may process data to be used by the data receiving parties 102.

Figure 2:
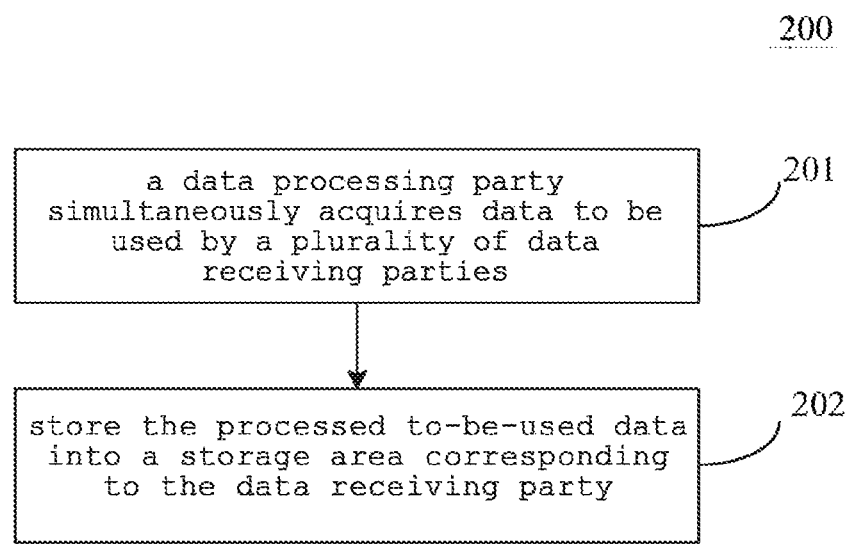
FIG. 2 is a flow chart of a data processing method according to an embodiment of the present application.

Referring to FIG. 2, FIG. 2 illustrates a flow 200 of a data processing method according to an embodiment of the present application. It should be noted that the data processing method provided in this embodiment of the present application may be executed by the data processing party 101 in FIG. 1. The method includes the following steps:

Step 201: A data processing party simultaneously acquires data to be used by a plurality of data receiving parties.

In this embodiment, a data processing party may simultaneously acquire data to be used by a plurality of data receiving parties, and respectively process the to-be-used data according to processing mode information that is received in advance from each data receiving party and that indicates a processing mode for the to-be-used data, to obtain processed to-be-used data corresponding to the data receiving party.

In an example where the data processing party and the data receiving party are a data processing process and a data receiving process in the autonomous driving system, respectively, the data to be used by the data receiving process may be a part of laser point cloud data collected by a laser radar provided on the autonomous driving vehicle. The data processing process may process the laser point cloud data to be used by the data receiving process. For example, the data to be used by the data receiving process is a part of the laser point cloud data collected by the laser radar, and this part of the laser point cloud data is laser point cloud data used for building a three-dimensional model of a vehicle driving environment. The data processing process may perform motion compensation processing on this part of the laser point cloud data. Therefore, the data receiving process may build the three-dimensional model of the vehicle driving environment by using the laser point cloud data that is motion-compensated.

In some optional implementations of this embodiment, before the data processing party simultaneously acquires data to be used by the plurality of data receiving parties, the method further includes: receiving a registration request sent by each data receiving party, wherein the registration request may include: an identifier of the data receiving party, and processing mode information indicating a processing mode for the data to be used by the data receiving party; and storing the identifier and the processing mode information in an associated manner.

In this embodiment, when the data receiving party requires the data processing party to process the to-be-used data, the data receiving party may send a registration request including an identifier of the data receiving party to the data processing party.

In an example where the data processing party and the data receiving party are respectively a data processing process and a data receiving process in the autonomous driving system, and the data to be used by the data receiving process is laser point cloud data, the data receiving process may send a registration request to the data processing process. The registration request includes: an identifier of the data receiving party, and processing mode information indicating a processing mode for the laser point cloud data to be used by the data receiving process. The data processing process may store the identifier of the data receiving party and the processing mode information in an associated manner. Therefore, the data processing process may acquire the laser point cloud data to be used by the data receiving process corresponding to the identifier, and process, according to the processing mode corresponding to the identifier, the laser point cloud data to be used by the data receiving process. The data receiving process may send, to the data processing process, an address of the to-be-used laser point cloud data in a memory. The data processing process may determine an address for storing the laser point cloud data to be used by the data receiving process in the memory according to the address of the to-be-used laser point cloud data in the memory, which is sent by the data receiving process.

In some optional implementations of this embodiment, the to-be-used data is laser point cloud data, and the processing mode includes: addition of a timestamp having a preset precision, and motion compensation. The step of simultaneously acquiring, by a data processing party, data to be used by a plurality of data receiving parties, and processing the to-be-used data according to processing mode information that is received in advance from each data receiving party and that indicates a processing mode for the to-be-used data, to obtain processed to-be-used data corresponding to the data receiving party may include: simultaneously copying, by the data processing party, laser point cloud data to be used by each data receiving party from the memory to a video memory of a graphics processing unit; and processing, by using the graphics processing unit and according to the processing mode corresponding to each data receiving party, the to-be-used laser point cloud data copied to the video memory of the graphics processing unit, to obtain processed to-be-used laser point cloud data corresponding to each data receiving party.

In an example where the data processing party and the data receiving party are a data processing process and a data receiving process in the autonomous driving system, respectively, the data to be used by each data receiving process may be a part of laser point cloud data collected by the laser radar. The data processing process may respectively uniform the data. For example, it may add a timestamp having a preset precision to the data, and perform the motion compensation on the data. Each data receiving process may use the processed to-be-used laser point cloud data. For example, after the data processing process uniformly adds a timestamp having a preset precision to and performs motion compensation on the laser point cloud data to be used by the plurality of data receiving processes, the plurality of data receiving processes may use the corresponding processed to-be-used laser point cloud data, and work collaboratively to build the three-dimensional model of the vehicle driving environment while using the timestamp having the preset precision to ensure the laser point cloud data.

The laser point cloud data to be used by the data receiving process may be a part of the laser point cloud data collected by the laser radar. The data processing process may copy the laser point cloud data to be used by each data receiving party from the memory to a graphics processing unit (GPU) at a time. The data processing process may determine, according to processing mode information that is received in advance from each data receiving party and that indicates a processing mode for the to-be-used data, a processing requirement of each data receiving process on the laser point cloud data, and may control the graphics processing unit to respectively process the laser point cloud data to be used by each data receiving process. For example, the processing mode information indicates performing motion compensation on the to-be-used laser point cloud data, and the processing requirement may include performing addition of a timestamp having a preset precision, and motion compensation.

Figure 3:
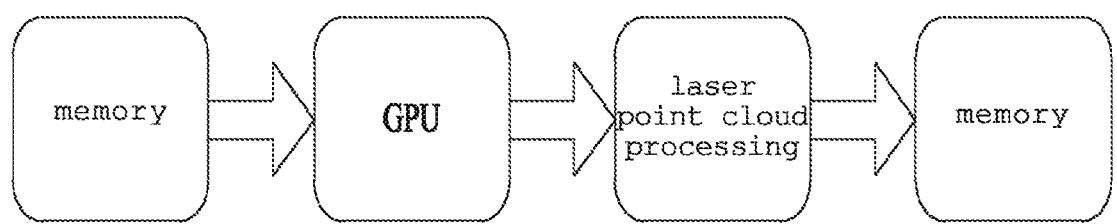
FIG. 3 is an exemplary flow chart of processing of laser point cloud data by a data processing party.

Referring to FIG. 3, FIG. 3 is an exemplary flow chart of processing of laser point cloud data by a data processing party.

In an example where the data processing party and the data receiving party are a data processing process and a data receiving process in the autonomous driving system, respectively, the laser point cloud data to be used by the data receiving process may be a part of laser point cloud data collected by a laser radar. The data processing process may perform laser point cloud processing on the laser point cloud data to be used by the data receiving process.

For example, when the laser point cloud data to be used by one data receiving process is laser point cloud data used for building a three-dimensional model of a vehicle driving environment, the data processing process may perform motion compensation processing on the laser point cloud data to be used by the data receiving process. To be specific, based on a coordinate conversion relationship between a collection time of the first laser point in a frame of laser point cloud and collection times of other laser points in a frame of laser point cloud, three-dimensional coordinates of all laser points in a frame of laser point cloud is to converted into the collection time of the first laser point in the frame of laser point cloud. Therefore, the data receiving process may acquire the laser point cloud data that is motion-compensated, to build the three-dimensional model of the vehicle driving environment. For another example, when different data receiving processes require laser point cloud data synchronization, the data processing process may add a timestamp having a preset precision to the laser point cloud data to be used by each data receiving process. Therefore, each data receiving process may perform the laser point cloud data synchronization by using the laser point cloud data to which the timestamp having the preset precision is added.

The data processing process may first respectively determine an address for storing the laser point cloud data to be used by each data receiving process in a memory, and then may simultaneously copy the laser point cloud data to be used by each data receiving process from the memory to a video memory of a graphics processing unit. Therefore, the laser point cloud data to be used by each data receiving process is copied to the graphics processing unit at a time. This avoids the problem that system overheads sharply increase because to-be-used data needs to be copied from the memory to the graphics processing unit multiple times when each data receiving party separately processes the to-be-used data. The data processing process may determine, according to processing mode information that is received in advance from each data receiving party and that indicates a processing mode for the to-be-used data, a processing requirement of each data receiving process on the laser point cloud data, and control the graphics processing unit to respectively process the laser point cloud data to be used by each data receiving process that is copied to the video memory. For example, the processing requirement may include performing addition of a timestamp having a preset precision, and motion compensation.

In some optional implementations of this embodiment, the simultaneously acquiring, by a data processing party, data to be used by a plurality of data receiving parties includes: calculating a ratio of a processing time of the data to be used by each of the plurality of data receiving parties to a running time of the data receiving party; determining, from the plurality of data receiving parties, a data receiving party of which the corresponding ratio is greater than a ratio threshold; and simultaneously acquiring the data to be used by the data receiving party.

In an example where the data processing party and the data receiving party are a data processing process and a data receiving process in the autonomous driving system respectively and the to-be-used data is laser point cloud data, the data processing process may calculate a ratio of a processing time for the laser point cloud data to be used by each data receiving process (for example, a time for performing motion compensation processing on the to-be-used laser point cloud data in the graphics processing unit) to a running time of the data receiving process. Then, data processing processes of which the corresponding ratio is greater than a ratio threshold may be determined, and laser point cloud data to be used by the data processing processes of which the corresponding ratio is greater than the ratio threshold is copied from the memory to the graphics processing unit at a time for processing.

Step 202: the processed to-be-used data is stored into a storage area corresponding to the data receiving party.

In this embodiment, after the to-be-used data sent by a plurality of data receiving parties is simultaneously processed in step 201, the processed to-be-used data may be stored into a storage area corresponding to the data receiving party.

In an example where the data processing party and the data receiving party are a data processing process and a data receiving process in the autonomous driving system, respectively, after the data processing process copies the laser point cloud data to be used by each data receiving process from the memory to the video memory of the graphics processing unit at a time and controls the graphics processing unit to respectively process the laser point cloud data to be used by each data receiving process that is copied to the video memory, the processed laser point cloud data to be used by each data receiving process may be copied from the video memory of the graphics processing unit to a storage area in the memory that is corresponding to each data receiving process. For example, when the laser point cloud data to be used by the data receiving process is laser point cloud data used for building a three-dimensional model of a vehicle driving environment, the data processing process may perform motion compensation on the to-be-used laser point cloud data and write the processed to-be-used laser point cloud data to a storage area in the memory that is corresponding to the data receiving process. Each data receiving process may acquire, from the corresponding storage area in the memory, the processed to-be-used laser point cloud data, for example, the laser point cloud data that is motion-compensated, and execute a preset operation, for example, to build the three-dimensional model of the vehicle driving environment by using the laser point cloud data that is motion-compensated.

Figure 4:
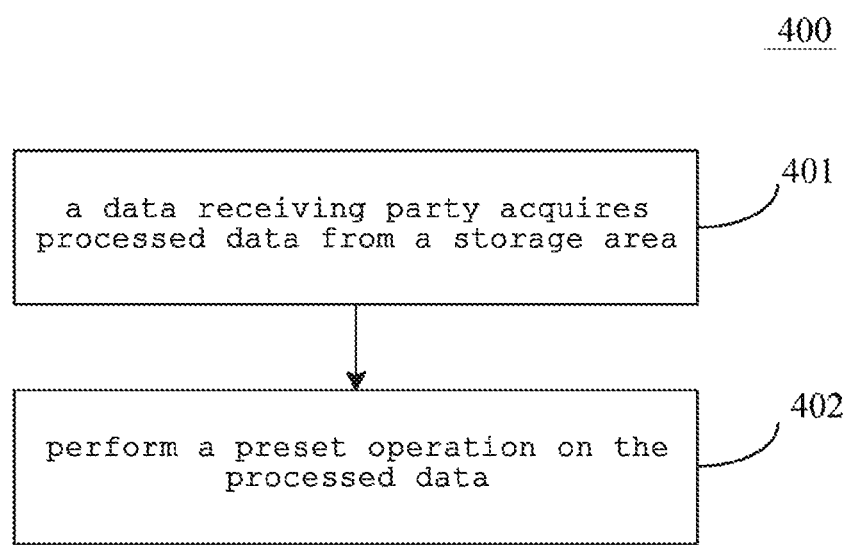
FIG. 4 is a flow chart of a data processing method according to another embodiment of the present application.

Referring to FIG. 4, FIG. 4 is a flow chart of a data processing method according to another embodiment of the present application. It should be noted that the data processing method provided in this embodiment of the present application may be executed by the data receiving party 102 in FIG. 1. The method includes the following steps:

Step 401: A data receiving party acquires processed data from a storage area.

In this embodiment, the processed data is obtained after a data processing party simultaneously acquires data to be used by a plurality of data receiving parties and processes the to-be-used data according to processing mode information that is received in advance from each data receiving party and that indicates a processing mode for the to-be-used data.

In this embodiment, the data receiving party may acquire, from a corresponding storage area in a memory, the processed data that is written by the data receiving party and that is obtained after the data to be used by the data receiving party is processed.

In this embodiment, the data processing party may process the data to be used by the data receiving party, to obtain processed data. In an example where the data processing party and the data receiving party are a data processing process and a data receiving process in the autonomous driving system, the laser point cloud data to be used by the data receiving process may be a part of laser point cloud data collected by a laser radar. The data processing process may process the laser point cloud data to be used by the data receiving process. For example, the data to be used by the data receiving process is a part of the laser point cloud data collected by the laser radar, and this part of the laser point cloud data is laser point cloud data used for building a three-dimensional model of a vehicle driving environment. The data processing process may perform motion compensation on this part of the laser point cloud data. Then, the laser point cloud data that is motion-compensated is written to the storage area corresponding to the data receiving process. Therefore, the data receiving party may acquire, from the storage area, the laser point cloud data that is motion-compensated, and build a vehicle driving environment by using the laser point cloud data that is motion-compensated.

The data processing process may first respectively determine a address for storing the laser point cloud data to be used by each data receiving process in a memory, and then may simultaneously copy the laser point cloud data to be used by each data receiving process from the memory to a video memory of a graphics processing unit. Therefore, the laser point cloud data to be used by each data receiving process is copied to the graphics processing unit at a time. The data processing process may determine, according to processing mode information that is received in advance from each data receiving party and that indicates a processing mode for the to-be-used data, a processing requirement of each data receiving process on the laser point cloud data, and may control the graphics processing unit to respectively process the laser point cloud data to be used by each data receiving process that is copied to the video memory. For example, the processing requirement may include performing addition of a timestamp having a preset precision, and motion compensation. The data processing process may copy the processed laser point cloud data to be used by each data receiving process from the video memory of the graphics processing unit to the storage area in the memory that is corresponding to each data receiving process.

Step 402: a preset operation is performed on the processed data.

In this embodiment, after the processed data is acquired from the storage area in step 401, a preset operation may be executed on the processed data.

For example, the preset operation is to build a three-dimensional model of a vehicle driving environment. When the laser point cloud data to be used by one data receiving process is laser point cloud data used for building a three-dimensional model of a vehicle driving environment, the data processing process may perform motion compensation on the laser point cloud data to be used by the data receiving process, to obtain processed data. The processed data, that is, the laser point cloud data that is motion-compensated, is written to a storage area corresponding to the data receiving process. The data receiving process may acquire, from the corresponding storage area, the laser point cloud data that is motion-compensated to build the three-dimensional model of the vehicle driving environment.

Figure 5:
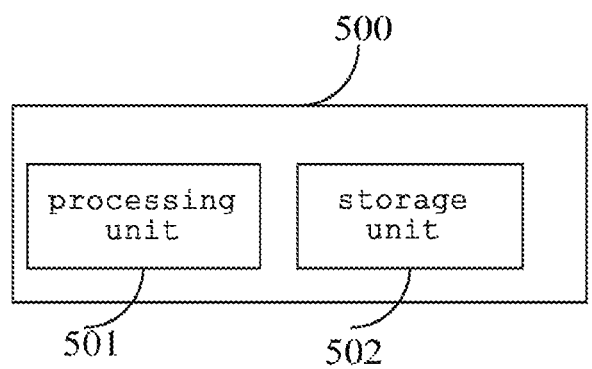
FIG. 5 is a schematic structural diagram of a data processing apparatus according to an embodiment of the present application.

Referring to FIG. 5, FIG. 5 is a schematic structural diagram of a data processing apparatus according to an embodiment of the present application. This apparatus embodiment corresponds to the method embodiment shown in FIG. 2.

As shown in FIG. 5, the data processing apparatus 500 of this embodiment includes: a processing unit 501 and a storage unit 502. The processing unit 501 is configured to simultaneously acquire data to be used by a plurality of data receiving parties, and process the to-be-used data according to processing mode information that is received in advance from each data receiving party and that indicates a processing mode for the to-be-used data, to obtain processed to-be-used data corresponding to the data receiving party. The storage unit 502 is configured to store the processed to-be-used data into a storage area corresponding to the data receiving party, so that the data receiving party acquires the processed to-be-used data from the storage area.

In some optional implementations of this embodiment, the apparatus 500 further includes: a receiving unit (not shown), configured to: before the data to be used by the plurality of data receiving parties is simultaneously acquired, receive a registration request sent by each data receiving party, the registration request including: an identifier of the data receiving party, and the processing mode information indicating the processing mode for the data to be used by the data receiving party; and store the identifier of the data receiving party and the processing mode information in an associated manner.

In some optional implementations of this embodiment, the processing unit 501 includes: a graphics processing unit processing subunit (not shown), configured to: when the to-be-used data is laser point cloud data, and the processing mode includes addition of a timestamp having a preset precision, and motion compensation, simultaneously copy laser point cloud data to be used by each data receiving party from a memory to a video memory of a graphics processing unit; and process, by using the graphics processing unit and according to the processing mode corresponding to each data receiving party, the to-be-used laser point cloud data copied to the video memory of the graphics processing unit, to obtain processed to-be-used laser point cloud data corresponding to each data receiving party.

In some optional implementations of this embodiment, the processing unit 501 includes: a data acquiring subunit (not shown), configured to: calculate a ratio of a processing time of the data to be used by each of the plurality of data receiving parties to a running time of the data receiving party; determine, from the plurality of data receiving parties, a data receiving party of which the corresponding ratio is greater than a ratio threshold; and simultaneously acquiring the data to be used by the data receiving party.

Figure 6:
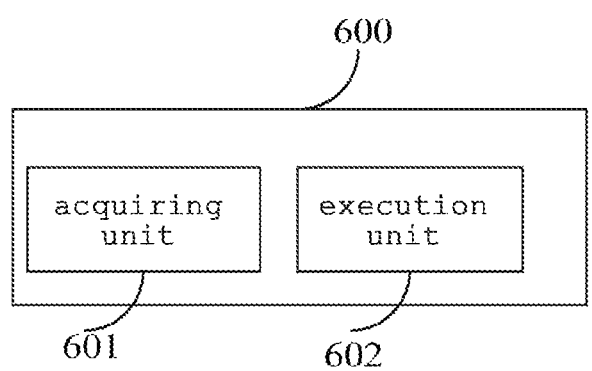
FIG. 6 is a schematic structural diagram of a data processing apparatus according to another embodiment of the present application.

Referring to FIG. 6, FIG. 6 is a schematic structural diagram of a data processing apparatus according to another embodiment of the present application. This apparatus embodiment corresponds to the method embodiment shown in FIG. 4.

As shown in FIG. 6, the data processing apparatus 600 of this embodiment includes: an acquiring unit 601 and an execution unit 602. The acquiring unit 601 is configured to acquire processed data, the processed data being obtained after a data processing party simultaneously acquires data to be used by a plurality of data receiving parties and processes the to-be-used data according to processing mode information that is received in advance from each data receiving party and that indicates a processing mode for the to-be-used data. The execution unit 602 is configured to execute a preset operation on the processed data.

Figure 7:
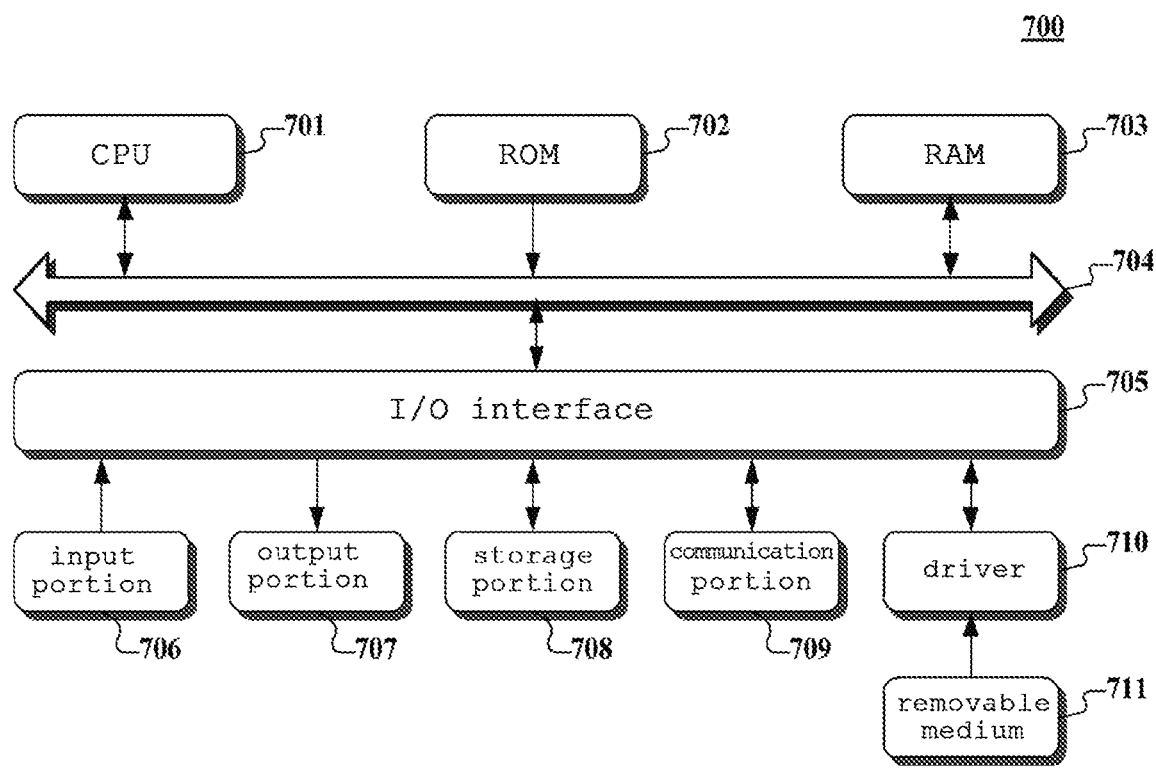
FIG. 7 is a schematic structural diagram of a computer system adapted to implement a data processing apparatus according to an embodiment of the present application.

FIG. 7 shows a schematic structural diagram of a computer system adapted to implement a data processing apparatus of the embodiments of the present application.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 709, and/or may be installed from the removable media 711.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: acquire simultaneously, by a data processing party, data to be used by a plurality of data receiving parties; and process, according to processing mode information, the to-be-used data to obtain processed to-be-used data corresponding to the data receiving parties, wherein the processing mode information is received in advance from each data receiving party and indicates a processing mode for the to-be-used data; and store the processed to-be-used data into a storage area corresponding to the data receiving parties, so that the data receiving parties acquire the processed to-be-used data from the storage area.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data processing method, comprising:
   acquiring simultaneously, by a data processing party, data to be used by data receiving parties; and processing the to-be-used data, based on processing mode information received in advance from the receiving parties and indicating a processing mode for the to-be-used data, to obtain processed to-be-used data corresponding to the data receiving parties; and storing the processed to-be-used data into a storage area corresponding to the data receiving parties, so that the data receiving parties acquire the processed to-be-used data from the storage area;

wherein before the acquiring simultaneously, by a data processing party, data to be used by data receiving parties, the method further comprises:

receiving a registration request sent by a data receiving party, the registration request comprising: an identifier of the data receiving party, and processing mode information indicating the processing mode for the data to be used by the data receiving party; and associating and storing the identifier of the data receiving party and the processing mode information in an associated manner.

2. The method according to claim 1, wherein the to-be-used data is laser point cloud data, and the processing mode comprises: addition of a timestamp having a preset precision, and motion compensation; and the acquiring simultaneously, by a data processing party, data to be used by data receiving parties; and processing the to-be-used data, based on processing mode information received in advance from the receiving parties and indicating a processing mode for the to-be-used data, to obtain processed to-be-used data corresponding to the data receiving parties comprises:

copying simultaneously, by the data processing party, the laser point cloud data to be used by each of the data receiving parties from a memory to a video memory of a graphics processing unit; and processing, by using the graphics processing unit and based on the processing mode corresponding to the each of the data receiving parties, the to-be-used laser point cloud data copied to the video memory of the graphics processing unit, to obtain processed to-be-used laser point cloud data corresponding to the each of the data receiving parties.

3. The method according to claim 2, wherein the acquiring simultaneously, by a data processing party, data to be used by a plurality of data receiving parties comprises:

calculating a ratio of a time for processing the data to be used by the each of the data receiving parties to a time for running a process of the data receiving party;

determining, from the data receiving parties, data receiving parties having a corresponding ratio greater than a ratio threshold; and acquiring simultaneously the data to be used by the data receiving parties having the corresponding ratio greater than the ratio threshold.

4. A data processing method, comprising:

acquiring, by a data receiving party, processed data, the processed data being obtained after a data processing party simultaneously acquires data to be used by data receiving parties and processes the to-be-used data based on processing mode information received in advance from the data receiving parties and indicating a processing mode for the to-be-used data; and executing a preset operation on the processed data;

wherein the method further comprises: sending, in response to the data receiving party requiring the data processing party to process the data to be used, a registration request the registration request comprising: an identifier of the data receiving party, and Processing mode information indicating the processing mode for the data to be used by the data receiving party.

5. A data processing apparatus, comprising:

at least one processor; and a memory storing instructions, wherein the instructions when executed by the at least one processor, cause the at least one processor to perform operations, the operations comprising:

acquiring simultaneously data to be used by data receiving parties; and process the to-be-used data, based on processing mode information received in advance from the receiving parties and indicating a processing mode for the to-be-used data, to obtain processed to-be-used data corresponding to the data receiving parties; and storing the processed to-be-used data into a storage area corresponding to the data receiving parties, so that the data receiving parties acquire the processed to-be-used data from the storage area;

wherein before the acquiring simultaneously, by a data processing party, data to be used by data receiving parties, the method further comprises:

receiving a registration request sent by a data receiving party, the registration request comprising: an identifier of the data receiving party, and processing mode information indicating the processing mode for the data to be used by the data receiving party; and associating and storing the identifier of the data receiving party and the processing mode information in an associated manner.

6. The apparatus according to claim 5, wherein the to-be-used data is laser point cloud data, and the processing mode comprises addition of a timestamp having a preset precision, and motion compensation; and the acquiring simultaneously data to be used by data receiving parties; and processing the to-be-used data, based on processing mode information received in advance from the receiving parties and indicating a processing mode for the to-be-used data, to obtain processed to-be-used data corresponding to the data receiving parties comprises:

copying simultaneously the laser point cloud data to be used by each of the data receiving parties from a memory to a video memory of a graphics processing unit; and processing, by using the graphics processing unit and based on the processing mode corresponding to the each of the data receiving parties, the to-be-used laser point cloud data copied to the video memory of the graphics processing unit, to obtain processed to-be-used laser point cloud data corresponding to the each of the data receiving parties.

7. The apparatus according to claim 6, wherein the acquiring simultaneously data to be used by a plurality of data receiving parties comprises:

calculating a ratio of a time for processing the data to be used by the each of the data receiving parties to a time for running a process of the data receiving party;

determining, from the data receiving parties, data receiving parties having a corresponding ratio greater than a ratio threshold; and acquiring simultaneously the data to be used by the data receiving parties having the corresponding ratio greater than the ratio threshold.

8. A data processing apparatus, comprising:

at least one processor; and a memory storing instructions, wherein the instructions when executed by the at least one processor, cause the at least one processor to perform operations, the operations comprising:

acquiring processed data, the processed data being obtained after a data processing party simultaneously acquires data to be used by data receiving parties and processes the to-be-used data based on processing mode information received in advance from the data receiving parties and indicating a processing mode for the to-be-used data; and executing a preset operation on the processed data;

wherein the operations further comprise: sending, in response to the data receiving party requiring the data processing part to process the data to be used, a registration request the registration request comprising: an identifier of the data receiving party, and processing mode information indicating the processing mode for the data to be used by the data receiving party.

* * * * *